(12) United States Patent
Fujie et al.

(10) Patent No.: US 7,133,967 B2
(45) Date of Patent: Nov. 7, 2006

(54) STORAGE SYSTEM, CONTROLLER, CONTROL METHOD AND PROGRAM PRODUCT THEREFOR

(75) Inventors: Yoshihiro Fujie, Fujisawa (JP); Tohru Sumiyoshi, Yokohama (JP); Yoshihiko Terashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 10/830,377

(22) Filed: Apr. 22, 2004

(65) Prior Publication Data

US 2004/0250019 A1 Dec. 9, 2004

(30) Foreign Application Priority Data

May 9, 2003 (JP) ............................. 2003-132165

(51) Int. Cl.
*G06F 12/00* (2006.01)
(52) U.S. Cl. .......................................... 711/114; 714/6
(58) Field of Classification Search ................ 711/114, 711/100, 170
See application file for complete search history.

(56) References Cited

U.S. PATENT DOCUMENTS

| | | | | |
|---|---|---|---|---|
| 5,838,891 A | * | 11/1998 | Mizuno et al. ................. | 714/5 |
| 6,094,728 A | * | 7/2000 | Ichikawa et al. ............... | 714/6 |
| 6,249,878 B1 | * | 6/2001 | MacLellan et al. ............ | 714/6 |
| 6,854,071 B1 | * | 2/2005 | King et al. ...................... | 714/8 |
| 2003/0221064 A1 | * | 11/2003 | Honda et al. ................ | 711/114 |
| 2004/0117580 A1 | * | 6/2004 | Wu et al. ................... | 711/170 |

FOREIGN PATENT DOCUMENTS

| | | |
|---|---|---|
| JP | PUPA06-139028 | 5/1994 |
| JP | PUPA08-30402 | 2/1996 |
| JP | PUPA10-240450 | 9/1998 |
| JP | PUPA11-259240 | 9/1999 |
| JP | PUPA2002-108571 | 4/2002 |

OTHER PUBLICATIONS

David Haussler, "Convolution Kernels on Discrete Structures", Technical Report UCSC-CRL-99-10, Santa Cruz, CA, URL: http://www.cse.ucsc.edu/haussler.

* cited by examiner

*Primary Examiner*—Sanjiv Shah
*Assistant Examiner*—Daniel Kim
(74) *Attorney, Agent, or Firm*—Mark E. McBurney

(57) ABSTRACT

A storage system in which a set of a data block and a redundancy block is stored has a plurality of control sections which respectively control a plurality of storages, a host connection unit which selects the control section controlling one of the storage in which a write data block which is a write-object block is to be stored, and a transfer unit which transfers the write data block to the control section. Each of the plurality of control sections includes a data block write section which writes the write data block transferred by a transfer unit to the storage in which the write data block is to be stored, a redundancy block update request section which requests the control section controlling the storage in which a redundancy block is to be stored to update the redundancy block, and a redundancy block update section which updates the redundancy block stored in the storage controlled by the control section when another of the control sections makes a request for updating the redundancy block.

9 Claims, 8 Drawing Sheets

FIG. 3

|  | NODE 60a | | NODE 60b | | NODE 60c | | NODE 60d | |
| --- | --- | --- | --- | --- | --- | --- | --- | --- |
|  | STORAGE 80a | STORAGE 81a | STORAGE 80b | STORAGE 81b | STORAGE 80c | STORAGE 81c | STORAGE 80d | STORAGE 81d |
| STRIPE 1 | DB1 | DB2' | DB2 | DB1' | S | PB' | PB | S |
| STRIPE 2 | PB | DB1' | DB1 | PB' | DB2 | S | S | DB2' |

STORAGE SYSTEM, CONTROLLER, CONTROL METHOD AND PROGRAM PRODUCT THEREFOR

DETAILED DESCRIPTION OF THE INVENTION

1. Field of the Invention

The present invention relates to a storage system, a controller, a control method, a program therefor and a recording medium. More particularly, the present invention relates to a storage system in which data blocks and redundancy blocks for regenerating the data blocks are stored by being distributed to a plurality of storages, a controller, a control method, a program therefor and a recording medium.

2. Background Art

Conventionally, the RAID (Redundant Arrays of Inexpensive Disks) technique is used to improve the access performance and fault tolerance of a storage such as a hard disk. For instance, in a RAID 5 configuration, a stripe formed of a set of a plurality of data blocks and a parity block which is redundancy data for regenerating any one of the plurality of data blocks when the data block becomes unreadable is stored by being distributed to a plurality of storages on a block-by-block basis. That is, for instance, a data block D1, a data block D2 and a parity block P are respectively stored in a storage 1, a storage 2, and a storage 3.

In a RAID 5 configuration, when one storage becomes faulty, one of data blocks or a parity block in one stripe is lost. Also in this case, the lost block can be regenerated on the basis of the blocks in the stripe other than the lost one. That is, when the storage 1 in the above-described instance fails, data block D1 is lost. In this case, data block D1 is regenerated on the basis of data block D2 and parity block P. In this manner, loss of data stored in one storage from when the storage fails is prevented.

Ordinarily, in conventional RAID-type storage systems, a plurality of storages forming RAID are controlled by one controller and generation of the above-mentioned parity block, regeneration of data blocks, etc., are performed by the one controller. For example see Published Unexamined Patent Application No. 9-81527, paragraph 0016, FIG. 3; Published Unexamined Patent Application No. 2001-249853, paragraph 0035, FIG. 1.

SUMMARY OF THE INVENTION

In a case where a large-scale storage system is constructed, the number of connected storages is increased. If a plurality of storages forming RAID are controlled by one controller in such a large-scale storage system, the controller becomes a bottleneck and it is therefore difficult to improve the performance of the storage system.

Therefore, an object of the present invention is to provide a storage system, a controller and control method capable of solving the above-described problem. This object can be attained by a combination of features described in the independent claims in the appended claims. In the dependent claims, further advantageous examples of the present invention are specified.

According to one mode of the present invention, there is provided a storage system in which a set of a data block and a redundancy block which is redundancy data for regenerating the data block when the data block becomes unreadable is stored by being distributed to a plurality of storages on a block-by-block basis. The system has a plurality of control sections which respectively control the plurality of storages. A host connection unit which receives from an external host system a write data block which is a data block to be stored in the storage system selects the control section controlling the storage in which the write data block is to be stored. A transfer unit transfers the received write data block to the control section controlling the storage in which the write data block is to be stored. Each of the plurality of control sections including a data block write section which writes the write data block transferred from the transfer unit to the storage in which the write data block is to be stored. A redundancy block update request section which requests the control section controlling the storage in which the redundancy block in the set including the write data block is to be stored to update the redundancy block. A redundancy block update section which updates the redundancy block stored in the storage controlled by the control section when another of the control sections makes a request for updating the redundancy block. There are also provided a controller, a control method, a program and a recording medium for this system.

According to a second mode of the present invention, there is provided a storage system in which a set of data blocks and mirror blocks which are mirrors of the data blocks is stored by being distributed to a plurality of storages on a block-by-block basis. The storage system having a first control section controls the first storage in which the first data block is stored and the second storage in which the first mirror block which is a mirror of the first data block is stored. A second control section which controls the third storage in which the second data block is stored and the fourth storage in which the second mirror block which is a mirror of the second data block is stored. A host connection unit reads out the first data block from the first storage through the first control section and forwards the first data block to an external host system when receiving from the host system a request for reading out the first data block, and which reads out the second data block from the second storage through the second control section and forwards the second data block to the host system when receiving from the host system a request for reading out the second data block. A selector which establishes an electrical connection between the first control section and the fourth storage in place of an electrical connection between the first control section and the second storage when the second control section or the first storage fails, wherein when a request for reading out the second data block is received from the host system in a state where the second control section is faulty, the host connection unit transfers the second data block readout request to the first control section, and the first control section receiving the second data block readout request reads out the second mirror block from the fourth storage electrically connected by the selector, and forwards the second mirror block to the host connection unit. There are also provided a controller, a control method, a program and a recording medium for this system.

In the summary of the present invention, not all the necessary features of the invention are listed. Subcombinations of the features can constitute the present invention.

BRIEF DESCRIPTION OF THE DRAWINGS

FIG. 3 shows the placement of data stored in the storage system 10 according to the embodiment of the present invention;

DESCRIPTION OF AN EMBODIMENT OF THE INVENTION

The present invention will be described with respect to an embodiment thereof. The embodiment described below, however, is not limiting the invention set forth in the appended claims, and all combinations of features described in the description of the embodiment are not necessarily indispensable to the solution according to the present invention.

Figure 1:
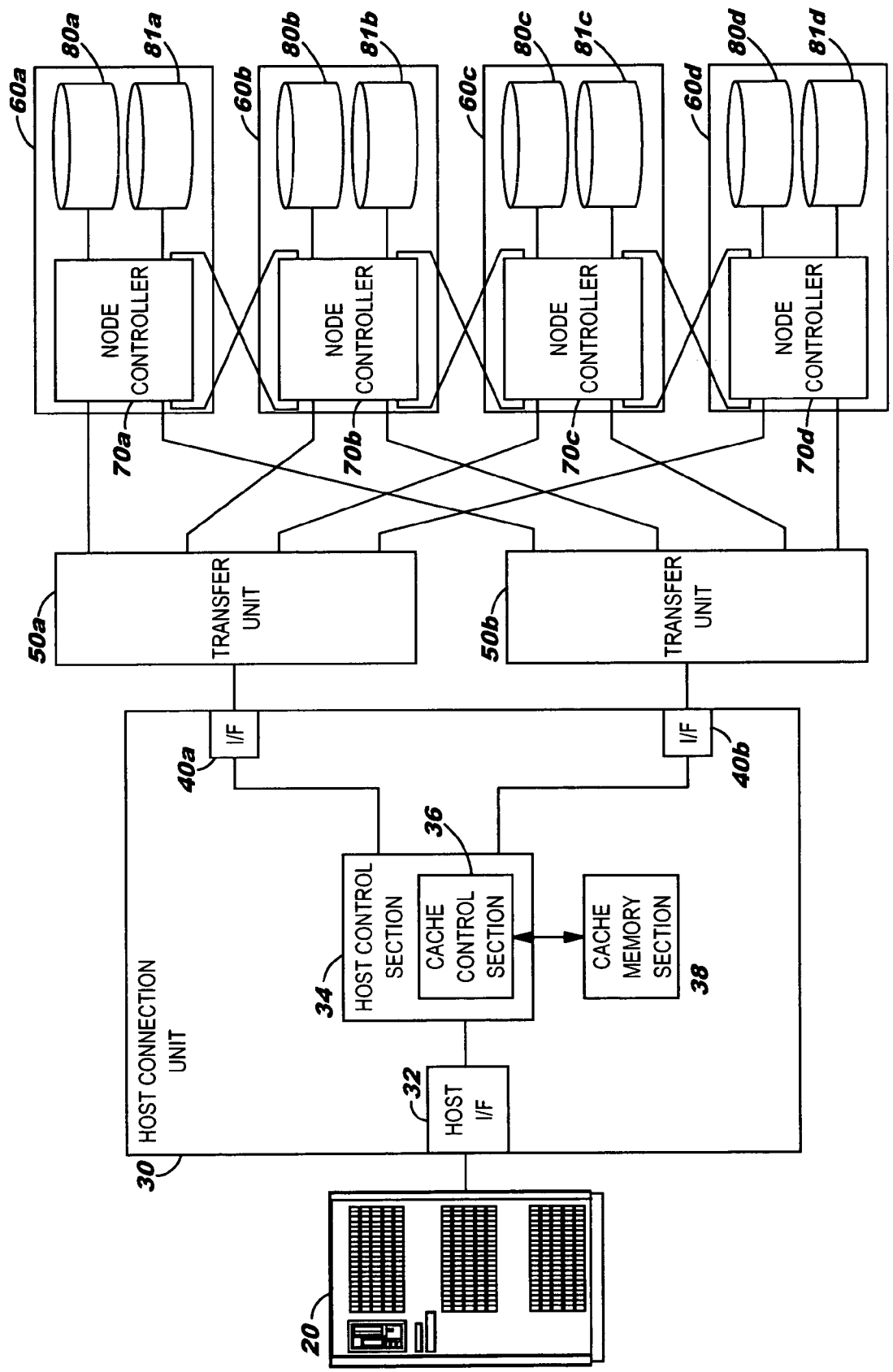
FIG. 1 shows the configuration of a storage system 10 according to an embodiment of the present invention.

FIG. 1 shows the configuration of a storage system 10 according to the embodiment. The storage system 10 has a host connection unit 30 connected to a host system 20 and a plurality of nodes 60. A plurality of storages 80 are connected to the storage system 10 by being distributed to the plurality of nodes 60. A host control section 34 provided in the host connection unit 30 controls data transfer, etc., between the storage system 10 and the host system 20, and node controllers 70 respectively provided in the plurality of nodes 60 perform distributed processing on access to individual data blocks, etc. In this manner, the occurrence of a bottleneck in a case where centralized control is performed on a plurality of nodes 60 by one controller can be avoided.

The storage system 10 has the host connection unit 30, one or a plurality of transfer units 50 and the plurality of nodes 60.

The host connection unit 30 is connected to the host system 20 directly or via a network, receives various commands from the host system 20, and responds to the host system 20 the results of processing in the storage system 10 corresponding to the commands.

Commands received by the host connection unit 30 from the host system 20 include a request for readout of a data block stored in at least one of the plurality of storages 80, a request for write of a data block to at least one of the plurality of storages 80, and a request for regenerating an unreadable data block to the original state, for example, in a case where the storages 80 fail, and writing the regenerated data block to the storage 80 recovered, for example, by replacement. These commands may be commands requiring block-by-block access to the storages 80, or commands requiring accessing a plurality of blocks at a time.

The host connection unit 30 has a host interface 32, a host control section 34, a cache memory section 38 and one or a plurality of interfaces 40.

The host interface 32 exchanges commands and data with the host system 20. The host control section 34 receives a command from the host system 20 through the host interface 32 and selects the node 60 in which the command is to be processed. The host control section 34 transfers the command to the selected node 60 via the interface 40 and the transfer unit 50, receives the result of processing from the node 60, and notifies the host system 20 of the processing result through the host interface 32.

The host control section 34 includes a cache control section 36 which controls a cache storage section 38, that is, the cache area for temporarily storing a data block read out. The cache control section 36 receives a readout request from the host system 20 and stores in the cache memory section 38 a data block read out from one of the storages 80. If the cache control section 36 receives from the host system 20 a request for reading out the data block stored in the cache memory section 38, it sends the data block to the host system 20 from the cache memory section 38 in response to the request.

The plurality of interfaces 40 are respectively connected between the host control section 34 and the one or the plurality of transfer units 50. Each of the plurality of transfer units 50 transfers a command transferred by the host control section 34 in the host connection unit 30 to the node 60 in which the command is to be processed, and transfers the result of processing of the command from the node 60 to the host control section 34. In this embodiment, the plurality of transfer units 50 connect the host connection unit 30 and the plurality of nodes 60 to each other. Even when one of the transfer units 50 fails, transfer of commands and processing results are performed by the other transfer units 50, thus improving the fault tolerance.

Each of the plurality of nodes 60 is mounted on a sub assembly detachably attached to an enclosure for the storage system 10. The sub assembly on which the nodes 60 are mounted may be a field replaceable unit (FRU) of the storage system 10.

Each of the plurality of nodes 60 has the storage 80, a storage 81, and the node controller 70.

Each of the storages 80 stores a set of one or a plurality of data blocks and a redundancy block provided in correspondence with the one or the plurality of data blocks by distributing the blocks on a block-by-block basis. That is, the plurality of storages 80 may have a RAID configuration such as a RAID 1 or RAID 5 configuration. A set of one or a plurality of data blocks and a redundancy block corresponding to these data blocks is called a stripe.

A redundancy block is redundancy data for regenerating a data block in one or a plurality of data blocks when at least this data block becomes unreadable. For example, in RAID 1, a set of one data block and a redundancy block which is a mirror of the data block is stored by being distributed to a plurality of storages 80. In RAID 5, a set of a plurality of data blocks and a redundancy block formed, for example, by bit-by-bit exclusive OR operation or the like on the basis of the plurality of data blocks is stored by being distributed in a plurality of storages 80.

In this embodiment, each node 60 has one storage 80. Alternatively, each node 60 may have a plurality of storages 80.

Each of the plurality of storages 81 is used as a mirror of one of the plurality of storages 80. In this embodiment, each of the plurality of nodes 60 has the storage 81 used as a mirror of the storage 80 provided in another of the nodes 60.

The plurality of node controllers 70 control the plurality of storages 80 and 81. That is, each node controller 70 controls the storage 80 in the node 60 in which the controller 70 is provided, and the storage 81 used as a mirror of the storage 80.

More specifically, when the node controller 70 receives a command from the host connection unit 30 through the transfer unit 50, it performs processing designated by the command and responds the result of processing to the host connection unit 30. In the processing according to the command, the node controller 70 may make one of the other node controllers 70 through the transfer unit 50 perform part of the processing according to the command and may indirectly access through the one of other node controllers 70 the storage 80 or 81 connected to the one of other node controllers 70.

Two of the plurality of nodes 60 as represented by the nodes 60a and 60b or the nodes 60c and 60d shown in the figure are used as a pair, and the storage 81 in each node 60 is used as a mirror of the storage 80 in the other node 60 in the corresponding pair. That is, the storages 81a, 81b, 81c, and 81d are respectively used as mirrors of the storages 80b, 80a, 80d, and 80c.

As described above, the plurality of node controllers 70 perform distributed processing such as accesses to data blocks according to commands received from the host system 20. That is, when the host system 20 issues an access command for access to a plurality of data blocks, the host connection unit 30 selects one of the nodes 60 according to the data blocks to be accessed, and transfers the access command to the node 60. Then the node controller 70 in the node 60 performs processing corresponding to the access command. In the storage system 10 of this embodiment, therefore, the plurality of node controllers 70 can perform distributed processing according to a command for access to a plurality of data blocks, thus reducing the amount of processing in the host control section 34 in the host connection unit 30 to prevent the host control section 34 from becoming a bottleneck.

Figure 2:
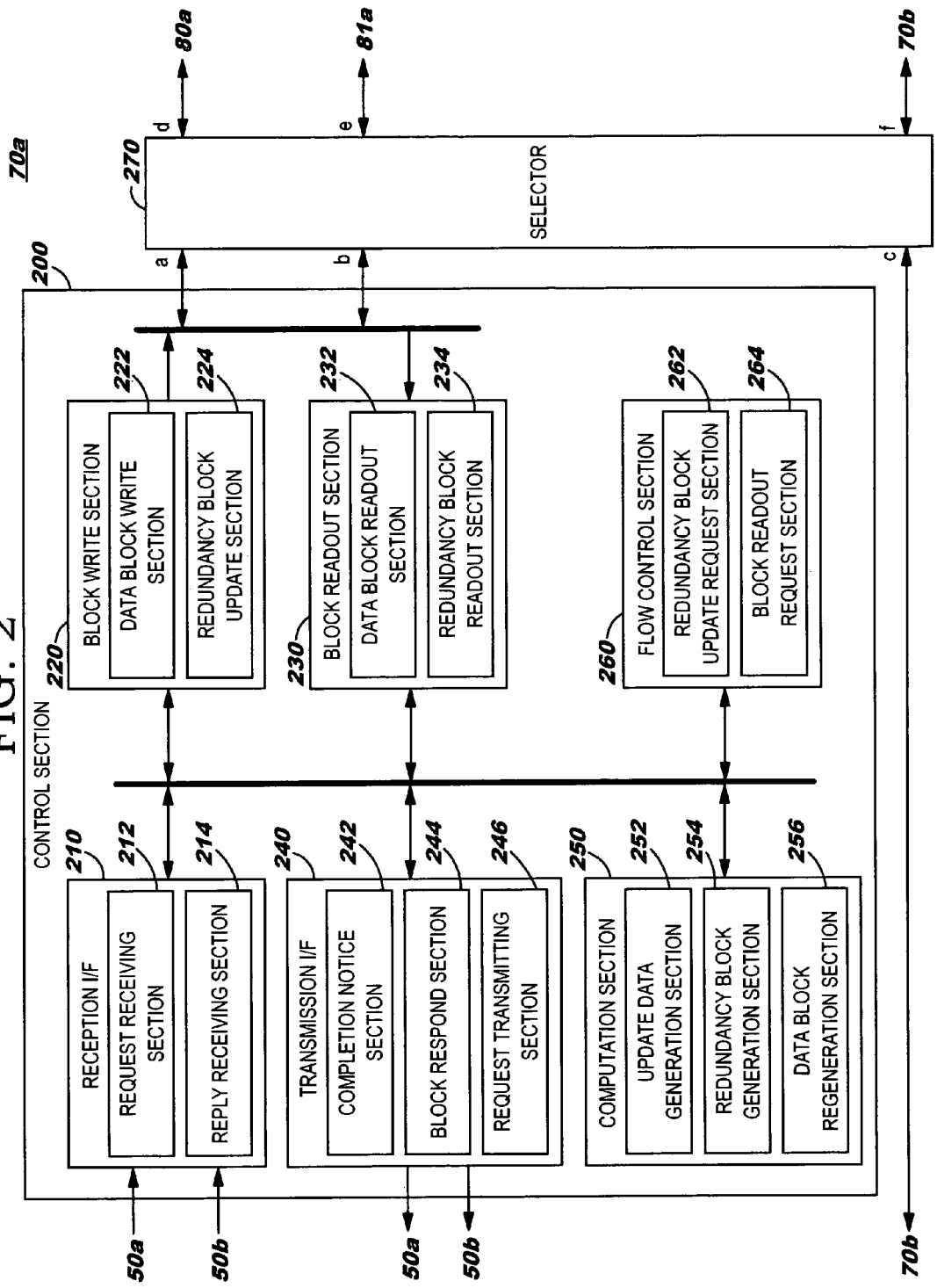
FIG. 2 shows the configuration of a node controller 70a according to the embodiment of the present invention.

FIG. 2 shows the configuration of the node controller 70a in this embodiment. The node controllers 70b to 70d have substantially the same configuration and functions as those of the node controller 70a. No description will therefore be made of the node controllers 70b to 70d except a description of points of difference.

The node controller 70a has a control section 200 and a selector 270. In the node controller 70a, circuits forming one semiconductor device may be implemented to realize the control section 200 and the selector 270.

Each of the plurality of control sections 200 provided in the storage system 10 controls one of the plurality of storages 80 and the storage 81 used as a mirror of the storage 80. Each control section 200 includes a reception interface 210, a block write section 220, a block readout section 230, a transmission interface 240, a computation section 250 and a flow control section 260.

The reception interface 210 is connected to the plurality of transfer units 50. The reception interface 210 includes a request receiving section 212 and a reply receiving section 214. The request receiving section 212 in one control section 200 receives through the transfer units 50 commands or the like issued to the control section 200 from the host connection unit 30 or the other control sections 200. The reply receiving section 214 receives, through the transfer unit 50, from one of the other control sections 200 to which this control section 200 has transmitted a command, a reply to the command, including the result of processing performed by the one of other control sections 200.

The block write section 220 writes a data block or a redundancy block to the storage 80a connected to the control section 200 and to the storage 81a or the storage 81b. The block write section 220 includes a data block write section 222 which writes to a write destination, e.g., the storage 80a a data block to be written, and a redundancy block update section 224 which updates a redundancy block stored in the storage 80a for example.

The block readout section 230 reads out a data block or a redundancy block from the storage 80a connected to the control section 200 and from the storage 81a or the storage 81b. The block readout section 230 includes a data block readout section 232 which reads out a data block stored in the storage 80a for example, and a redundancy block readout section 234 which reads out a redundancy block stored in the storage 80a for example.

The transmission interface 240 is connected to the plurality of transfer units 50. The transmission interface 240 includes a completion notice section 242, a block respond section 244 and a request transmitting section 246. The completion notice section 242 in one control section 200 responds to the host connection unit 30 or one of the other control sections 200 issuing a command to this control section 200 the result of processing according to the command. When a request for readout of a data block or a redundancy block from the host connection unit 30 or one of the other control sections 200 is received, the block respond section 244 responds the data block or the redundancy block read out by the block readout section 230 to the unit or the section that has made the readout request. The request transmitting section 246 transmits, to one of the other control sections 200, through the transfer unit 50, a command issued from this control section 200 to the one of other control sections 200.

The computation section 250 performs computation for updating a redundancy block and computation for regenerating a data block. The computation section 250 includes an update data generation section 252, a redundancy block generation section 254 and a data block regeneration section 256. The update data generation section 252 generates update data used for updating of a redundancy block in one set including a data block when the control section 200 writes the data block to the storage 80a and to the storage 81a or the storage 81b. The redundancy block generation section 254 generates a new redundancy block on the basis of the redundancy block before updating and update data if the control section 200 is requested by one of the other control sections 200 to update the redundancy block. When a data block or a redundancy block in one set becomes unreadable, the data block regeneration section 256 regenerates the unreadable block to the original state on the basis of the other data block and/or the redundancy block in the set. The computation section 250 may be implemented as a piece of computation processing hardware for performing computation processing in the update data generation section 252, the redundancy block generation section 254 and/or the data block regeneration section 256. Alternatively, the computation section 250 may be implemented as a combination of a processor provided in the control section 200 and a program for enabling the processor to function as the update data generation section 252, the redundancy block generation section 254 and/or the data block regeneration section 256.

The flow control section 260 controls various kinds of processing in the control section 200. The flow control section 260 includes a redundancy block update request section 262 and a block readout request section 264. When the control section 200 receives a request for write of a data block from the host connection unit 30, it requests through the request transmitting section 246 the control section 200 in the node 60 in which the redundancy block in the set including the data block is stored to update the redundancy block. In the case of regeneration of a unreadable data block or a unreadable redundancy block to the original state, the block readout request section 264 requests through the request transmitting section 246 one of the other control sections 200 to read out the data block or the redundancy block in the set including the unreadable block. The flow control section 260 may be implemented as a control circuit in hardware form or a combination of a processor provided in the node controller 70a and a program for enabling the processor to function as the redundancy block update request section 262 and the block readout request section 264.

The selector 270 establishes electrical connections between ports a, b, and c and ports d, e, and f. The ports a and b are respectively connected to the block write section 220 and the block readout section 230 in the control section 200. The port c is connected to the port f of the selector 270 in the node controller 70b provided in the node 60b mated with the node 60a. The ports d and e are respectively connected to the storages 80a and 81a. The port f is connected to the port c of the selector 270 in the node controller 70b which is provided in the node 60b mated with the node 60a.

The selector 270 in the node controller 70a is capable of selecting between electrically connecting the control section 200 in the node controller 70a to the storage 81a and electrically connecting the control section 200 to the storage 81b via itself and via the selector 270 in the node controller 70b. Similarly, the selector 270 in the node controller 70b is capable of selecting between electrically connecting the control section 200 in the node controller 70b to the storage 81b and electrically connecting the control section 200 to the storage 81a via itself and via the selector 270 in the node controller 70a. That is, when the storage 81b is used as a mirror of the storage 80a, the node controller 70a sets the selector 270 in the node controller 70a so that the port a is electrically connected to the port d, the port b to the port f, and the port c to the port e. Similarly, the node controller 70b sets the selector 270 in the node controller 70b so that the port a is electrically connected to the port d, the port b to the port f, and the port c to the port e. In the description of this embodiment, this connection form is referred to as a cross connection form.

In the cross connection form, the block write section 220 and the block readout section 230 in the node controller 70a are electrically connected to the storage 80a via the port a to access the storage 80a through the selector 270 in the node controller 70a. Also, the block write section 220 and the block readout section 230 in the node controller 70a are connected to the port c of the selector 270 in the node controller 70b via the ports b and f of the selector 270 in the node controller 70a and further connected to the storage 81b via the port e of the selector 270 in the node controller 70b to access the storage 81b through the selector 270 in the node controller 70a and the selector 270 in the node controller 70b. Similarly, the block write section 220 and the block readout section 230 in the node controller 70b can access the storages 80b and 81a through the ports a and b of the selector 270 in the node controller 70b.

On the other hand, when each of the node controllers 70a and 70b sets the selector 270 therein so that the port a is electrically connected to the port d and the port b is also electrically connected to the port e, the block write section 220 and the block readout section 230 in the node controller 70a can access the storages 80a and 81a through the ports a and b. Also, the block write section 220 and the block readout section 230 in the node controller 70b can access the storages 80b and 81b through the ports a and b. In the description of this embodiment, this connection form is referred to as a straight connection form.

FIG. 3 shows the placement of data stored in the storage system 10 of this embodiment.

In this embodiment, the storage system 10 has, for example, a RAID 50 configuration. That is, a set of a plurality of data blocks and a redundancy block is stored as one stripe by being distributed to a plurality of storages 80. Also, mirrors of the plurality of data blocks and the redundancy block forming one stripe are stored by being distributed to a plurality of storages 81.

More specifically, in this embodiment, each stripe includes a data block 1 (DB1 in the figure), a data block 2 (DB2 in the figure) and a parity block (PB in the figure) which is an example of the redundancy block. DB1, DB2 and PB included in stripe 1 are respectively stored in the storage 80a in the node 60a, the storage 80b in the node 60b and the storage 80d in the node 60d. The storage 80c in the node 60c may be provided with a spare block (S in the figure). If one of the blocks in the stripe becomes unreadable, the spare block may be used instead of the unreadable block.

DB1, DB2 and PB included in stripe 1 are respectively stored as mirrors in the storage 81b in the node 60b, the storage 81a in the node 60a and the storage 81c in the node 60c. In the figure, the blocks provided as mirrors of DB1, DB2 and PB are respectively shown as DB1', DB2' and PB'. Also, the storage 81d in the node 60d may be provided with a spare block (S in the figure). If one of the blocks functioning as mirrors in the stripe becomes faulty, the spare block may be used instead of the unreadable block.

DB1, DB2 and PB in stripe 2 are stored in the storages 80a to 80d by being rotated so that PB is stored in the storage 80 other than that in which PB in stripe 1 is stored. Thus, PBs in all the stripes are stored in particular ones of the storages 80 to prevent concentration of access to PB in a particular one of the storages 80.

If the storage system 10 has a RAID 5 configuration, the storages 81a to 81d are not necessarily used. Alternatively, the storages 81a to 81d store a stripe different from that distributed to the storages 80a to 80d, and the stripes including those distributed to the storages 81a to 81d may be used as one volume.

Figure 4:
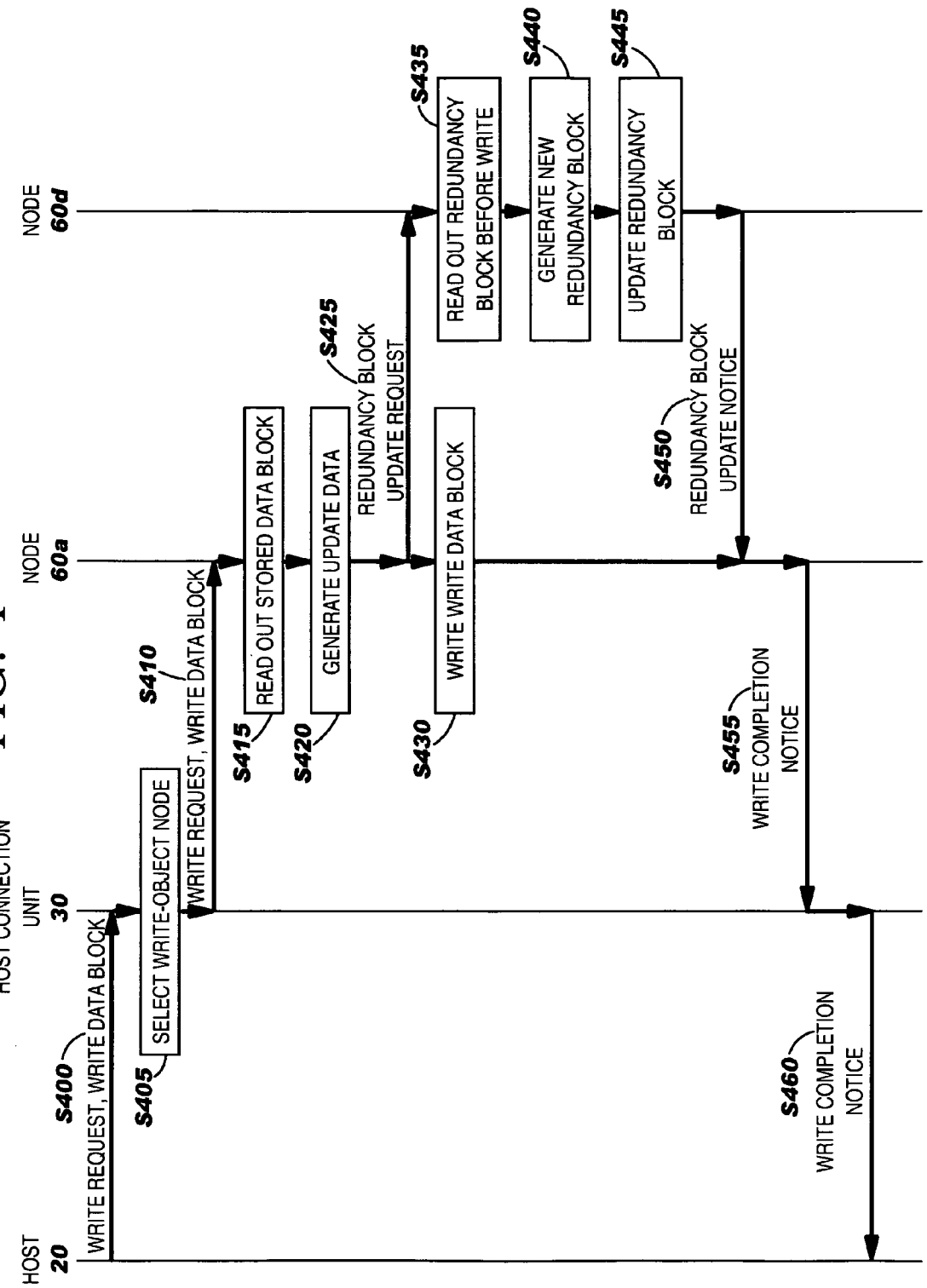
FIG. 4 shows the flow of data block write processing in the storage system 10 according to the embodiment of the present invention.

FIG. 4 shows the flow of write processing as an example of writing of a data block as DB1 in stripe 1 shown in FIG. 3 in the storage system 10 of this embodiment.

First, the host connection unit 30 receives from the host system 20 a command which is a write request and a write data block which is a writing-object data block to be stored in the storage system 10 (S400). Subsequently, the host control section 34 in the host connection unit 30 selects the control section 200 in the node controller 70a which controls the storage 80 in which the write data block is to be stored (S405). At this stage, the host control section 34 may select the storage 80 in which the write data block is to be stored on the basis of a logical block number which is received from the host system 20 and at which the write data block is to be stored, and the control section 200 for control of the storage 80 in which the write data block is to be stored by computing the block number on the storage 80 at which the write data block is to be stored.

Subsequently, the transfer unit 50 transfers the write request and the write data block received from the host system 20 to the control section 200 which is selected by the host control section 34 and which controls the storage 80 in which the write data block is to be stored (S410). That is, in this example, the transfer unit 50 transfers the write data block to the control section 200 in the node controller 70*a* controlling the storage 80*a* in which the write data is to be stored. Consequently, the request receiving section 212 in the node controller 70*a* receives the write request and the write data block.

When the write request and the write data block are received, the data block readout section 232 in the node controller 70*a* reads out the stored data block stored in the storage area on the storage 80*a* to which the write data block is to be written (S415). The data block readout section 232 performs this reading before the write data block transferred from the transfer unit 50 and received by the request receiving section 212 is written to the storage 80*a*.

Subsequently, the update data generation-section 252 generates update data used for updating the redundancy block in the set including the write data block on the basis of the write data block received in S410 and the stored data block read out in S415 (S420). If the storage system 10 has a RAID 5 configuration, the update data generation section 252 may generate update data by performing exclusive OR operation on the write data block and the stored data block on a bit-by-bit basis.

Subsequently, the redundancy block update request section 262 in the flow control section 260 requests the control section 200 controlling the storage 80 in which the redundancy block in the set including the write data block is to be stored to update the redundancy block (S425). That is, in this example, the redundancy block update request section 262 transmits, to the control section 200 controlling the storage 80*d* in which the redundancy block PB in stripe 1 is to be stored, through the request transmitting section 246, a redundancy block update request and the update data generated by the update data generation 252. Subsequently, the data block write section 222 in the block write section 220 writes the write data block to the storage 80*a* in which the write data block is to be stored (S430). If the storage system 10 has a RAID 50 configuration, the data block write section 222 may further write the write data block to the storage 81*b* which is a mirror storage functioning as a mirror of the storage 80*a* controlled by the control section 200 having the data block write section 222 through the selector 270 in the node controller 70*a* and the selector 270 in the node controller 270*b*.

In S425, the request receiving section 212 in the node controller 70*d* receives the redundancy block update request and the update data from the node controller 70*a*. In the case of being requested from one of the other control sections 200 by means of a redundancy block update request to update the redundancy block, the redundancy block readout section 234 in the node controller 70*d* reads out the redundancy block before updating stored in the storage 80*d* controlled by the control section 200 in the node controller 70*d* (S435).

Subsequently, the redundancy block generation section 254 in the node controller 70*d* generates a new redundancy block in one set including the write data block written to the storage 80*a* in S430 on the basis of the redundancy block before updating read out in S435 and the update data generated in S420 (S440). If the storage system 10 has a RAID 5 configuration, the redundancy block generation section 254 may generate a new redundancy block by performing exclusive OR operation on the redundancy block before updating and the update data on a bit-by-bit basis.

Subsequently, the redundancy block update section 224 updates the redundancy block by writing the redundancy block generated by the redundancy block generation section 254 in S440 at the redundancy block update request to the storage 80*d* in which the redundancy block is to be stored (S445). If the storage system 10 has a RAID 50 configuration, the redundancy block update section 224 may update the redundancy blocks respectively stored in the storage 80*d* controlled by the control section 200 having the redundancy block update section 224 and the storage 81*c* which is a mirror storage functioning as a mirror of the storage 80*d*, by writing new redundancy blocks to the storages 80*d* and 81*c*.

After updating the redundancy block, the redundancy block update section 224 transmits an update notice indicating that the redundancy block has been updated to the control section 200 in the node controller 70*a* that has requested updating of the redundancy block (S450). In the case where the control section 200 in the node controller 70*a* receives the redundancy block update notice and where it writes the write data block in one set including the corresponding redundancy block to the storage 80*a* in S430, it transmits a write completion notice to the host system 20 through the transfer unit 50 and the host connection unit 30 (S455, S460). Through this notice, the host system 20 is informed of the completion of processing according to the write request issued in S400.

As described above, when the storage system 10 receives a write request, it transfers the write request to the control section 200 controlling the storage 80 in which a write data block is to be stored, and the control section 200 performs the generation of update data accompanying write processing (S420). This control section 200 makes one of the other control sections 200 controlling one of the other storages 80 in which a redundancy block is to be stored generate a new redundancy block (S440). When receiving a write request, the storage system 10 can make the plurality of control sections 200 perform distributed processing according to the write request, as described above. Thus, a phenomenon in which processing or communication is concentrated on a controller performing centralized processing to cause the controller to become a bottleneck can be prevented.

Also, the control section 200 generates update data in S420 and transmits the update data to the control section 200 which is to store a redundancy block, thereby reducing the communication overhead between the control sections 200 in comparison with transmission of both a write data block and a stored data block to the control section 200 which is to store a redundancy block.

Figure 5:
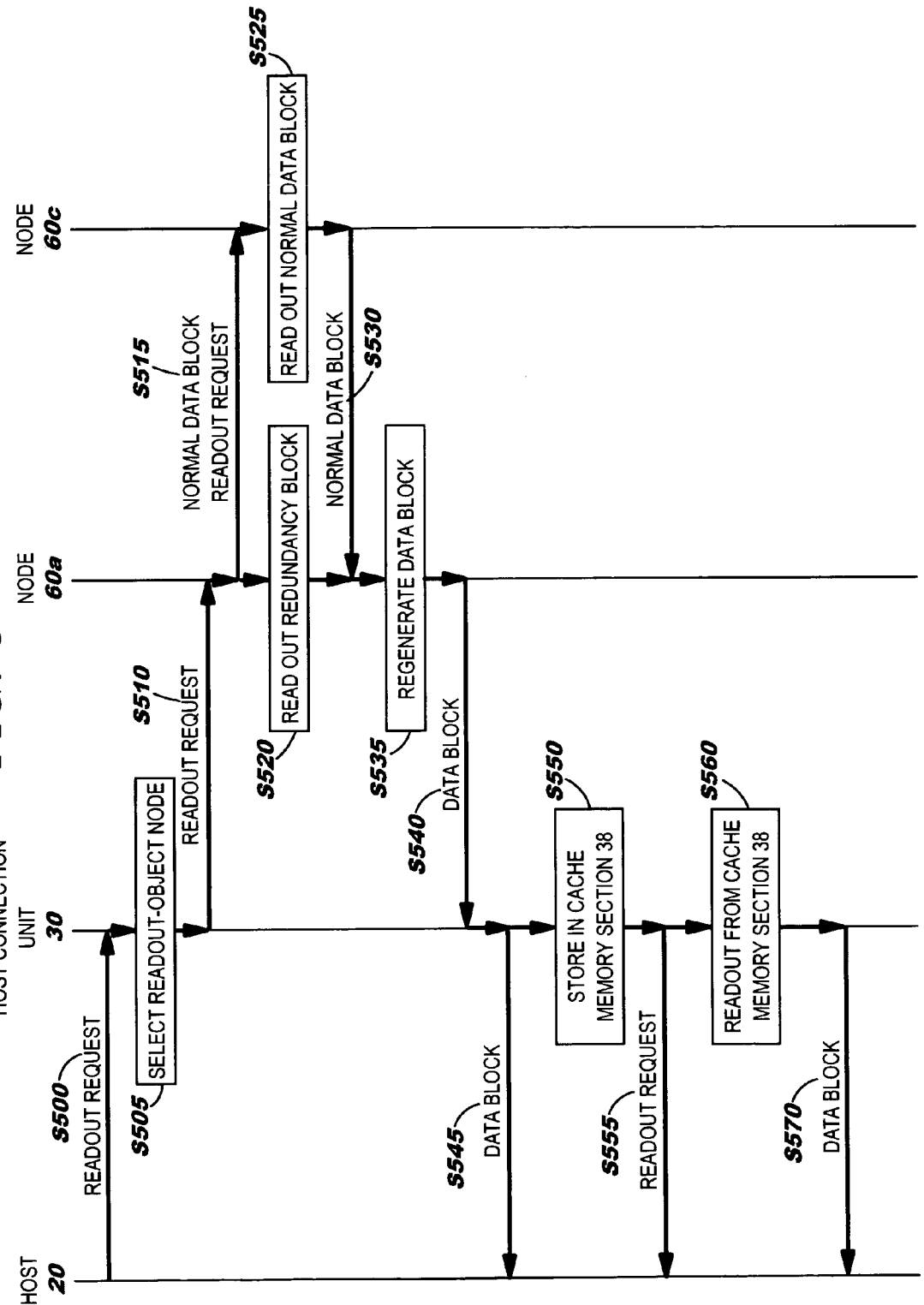
FIG. 5 shows the flow of data block regeneration readout processing in the storage system 10 according to the embodiment of the present invention.

FIG. 5 shows the flow of data block regeneration readout processing as an example of regeneration and reading of DB1 in stripe 2 shown in FIG. 3 in a situation where DB1 is unreadable in the storage system 10 of this embodiment.

First, the host connection unit 30 receives from the host system 20 a command which is a request for reading out a unreadable data block (S500). Subsequently, the host control section 34 in the host connection unit 30 selects the control section 200 in the node controller 70*a* controlling the storage 80*a* in which the redundancy block in the set including the unreadable data block is stored (S505) and transfers the readout request to the control section 200 through the transfer unit 50 (S510). The host control section 34 may store unreadable block information indicating a unreadable block with respect to each of the plurality of storages 80 and determine whether or not the data block to be read out is unreadable on the basis of the unreadable block information. Alternatively, the host control section 34 may store faulty storage information indicating whether or not the plurality of storages 80 are faulty on a storage-by-storage basis and determine on the basis of the faulty storage information that each data block or redundancy block stored in a faulty one of the storages 80 is faulty.

When the request receiving section 212 in the node controller 70*a* receives the request for reading out the unreadable data block, the redundancy block readout section 234 in the node controller 70*a* reads out the redundancy block (PB in this example) in the set including the unreadable data block from the storage 80*a* in which the redundancy block is stored (S520).

Also, the block readout request section 264 in the node controller 70*a* requests the control section 200 in the node controller 70*c*, which controls the storage 80*c* in which the normal data block (DB2 in this example) in the set including the unreadable data block (DB1 in this example) and the redundancy block PB read out in S520 is stored, to read out the normal data block DB2 (S515).

The request receiving section 212 in the node controller 70*c* receives the readout request from the control section 200 in the node controller 70*a* through the transfer unit 50. At this request, the data block readout section 232 in the node controller 70*c* reads out from the storage 80*c* the normal data block DB2 designated by the readout request (S525) and responds the read data block to the control section 200 in the node controller 70*a* through the block respond section 244 (S530). If each stripe has three or more data block, the control section 200 in the node controller 70*a* may request the plurality of other control sections 200 to read out the normal data blocks, and each of the plurality of other control sections 200 may respond the read normal data block to the control section 200 in the node controller 70*a*.

The reply receiving section 214 in the node controller 70*a* receives the normal data block DB2. When this block is received, the data block regeneration section 256 in the node controller 70*a* regenerates the unreadable data block to the original state on the basis of the normal data block DB2 read out by one of the other control sections 200 according to the request from the block readout request section 264 and responded to this control section 200 and the redundancy block read out in S520 (S535). If the storage system 10 has a RAID 5 configuration, the data block regeneration section 256 may regenerate the unreadable data block to the original state by performing bit-by-bit exclusive OR operation on the normal data block read out from the one other control section 200 and the redundancy block. Subsequently, the block respond section 244 responds the regenerated data block to the host system 20 through the transfer unit 50 and the host connection unit 30 (S540, S545).

Subsequently, the cache control section 36 in the host connection unit 30 stores in the cache memory section 38 the data block regenerated in S535 (S550). The cache control section 36 sets a higher priority with which the regenerated data block remains in the cache memory section 38 in comparison with data blocks which have been normal.

When a request for reading out the same data block as that in S500 is received from the host system 20 (S555), the cache control section 36 reads out the regenerated data block stored in the cache memory section 38 (S560) and responds the read data block to the host system 20 (S570).

As described above, in the storage system 10 of this embodiment, when a request for reading out a unreadable data block is received, the control section 200 which controls the storage 80 in which the redundancy block in the set including the data block is stored and which is provided in one of the nodes 60 other than the node 60 in which the data block is stored is made to regenerate the data block. It is thereby ensured that even after one node 60 has failed, data blocks can be regenerated by nodes 60 other than the node 60 that has failed, thus improving the fault tolerance. Also, the storage system 10 can make the plurality of control sections 200 perform distributed processing according to a request for reading out a unreadable data block. Thus, a phenomenon in which processing or communication is concentrated on a controller performing centralized processing to cause the controller to become a bottleneck can be prevented.

Also, the cache control section 36 stores in the cache memory section 38 a regenerated data block with a higher priority in comparison with data blocks which have been normal, thus reducing the overhead accompanying regeneration of a data block.

Figure 6:
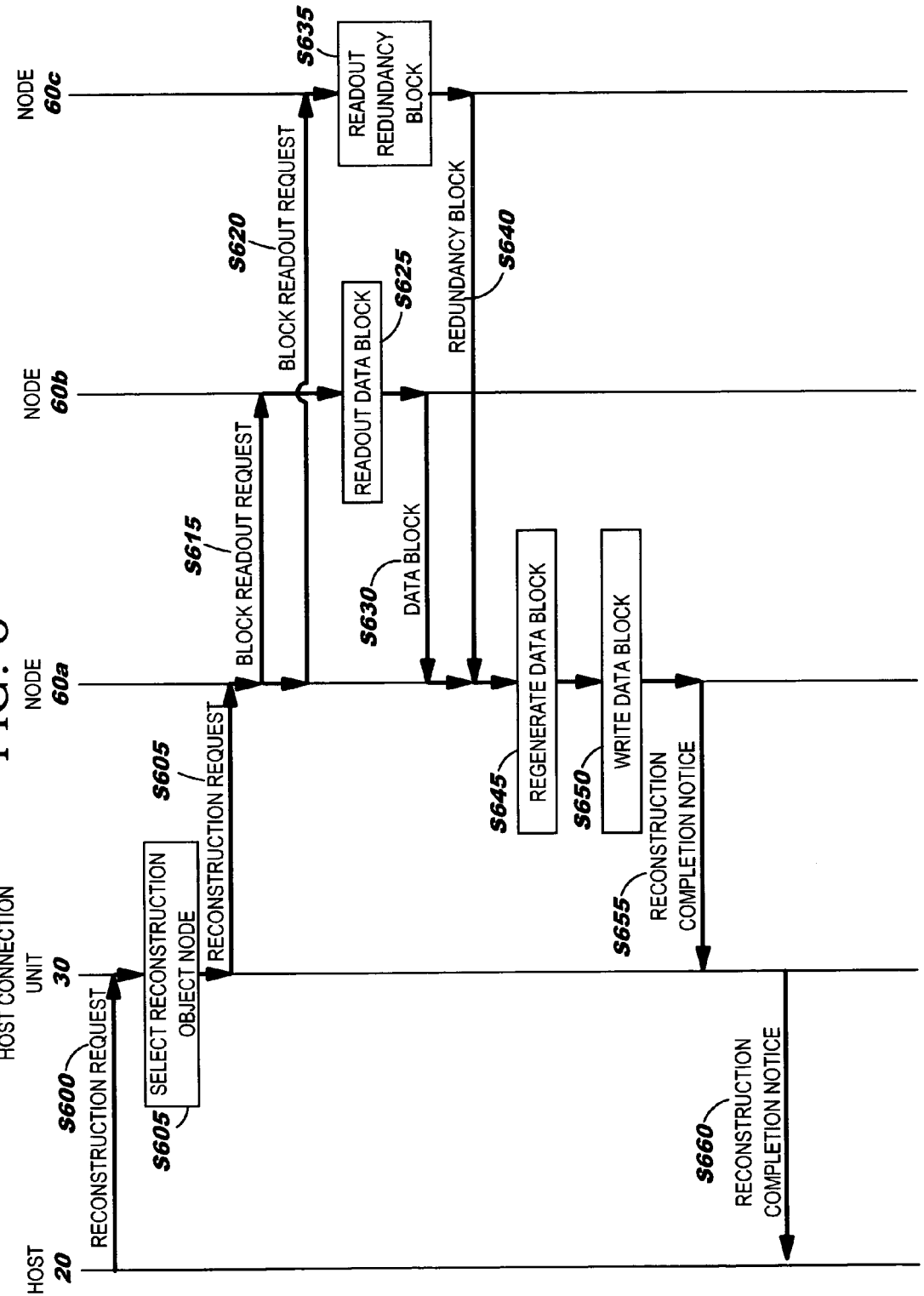
FIG. 6 shows the flow of data block reconstruction processing in the storage system 10 according to the embodiment of the present invention.

FIG. 6 shows the flow of data block reconstruction processing as an example of reconstruction of DB1 in stripe 1 shown in FIG. 3 in the storage system 10 of this embodiment.

For example, in a case where the node controller 70*a* and/or the storage 80*a* fails, the node 60*a* is removed from the enclosure of the system 10 and replaced with a new node 60*a*. In this case, the data block and the redundancy block stored in the storage 80*a* before replacement are lost. If the storage system 10 has a RAID 50 configuration, the storage 80*a* and the storage 81*a* in the node 60*a* can be reconstructed in such a manner that after replacement of the node 60*a*, the node controller 70*a*, for example, copies the blocks in the storage 81*b* to the storage 80*a* and the node controller 70*b* copies the blocks in the storage 80*b* to the storage 81*a*. If the storage system 10 has a RAID 5 configuration, the storage 80*a* is reconstructed after replacement of the node 60*a* by a process described below on the basis of the data blocks and/or redundancy blocks stored in the nodes 60*b* to 60*d*.

First, the host connection unit 30 receives from the host system 20 a command which is a reconstruction request for regenerating a unreadable block and writing the block to the storage 80 in which the block is to be stored (S600). Subsequently, the host control section 34 in the host connection unit 30 selects the control section 200 in the node controller 70*a* controlling the storage 80*a* in which the unreadable block DB1 is to be stored (S605) and transfers through the transfer unit 50 the request for reconstruction of the unreadable block DB1 (S610). When the request receiving section 212 in the node controller 70*a* receives the reconstruction request, the block readout request section 264 transmits readout request commands requesting readout of the data block DB2 and/or the redundancy block PB in the set including the unreadable block DB1 through the transfer units 50 to the control sections 200 controlling the storages 80*b* and 80*d* in which these data block and/or the redundancy block is stored (S615, S620).

When the control section 200 in the node controller 70*b* receives the readout request through the request receiving section 212, it reads out the data block DB2 from the storage 80*b* through the data block readout section 232 (S625) and responds the data block to the control section 200 in the node controller 70*a* (S630). Similarly, when the control section 200 in the node controller 70*d* receives the readout request through the request receiving section 212, it reads out the redundancy block PB from the storage 80*d* through the redundancy block readout section 234 (S635) and responds the redundancy block to the control section 200 in the node controller 70*a* (S640).

Subsequently, the data block regeneration section 256 in the node controller 70*a* regenerates the unreadable data block DB1 to the original state on the basis of the data block DB2 and the redundancy block PB responded from the other control sections 200 according to the request from the block readout request section 264 (S645). That is, if the storage system 10 has a RAID 5 configuration for example, the data block regeneration section 256 regenerates the data block DB1 by performing bit-by-bit exclusive OR operation on the data block DB2 and the redundancy block PB. The data block write section 222 then writes the data block DB1 regenerated by the data block regeneration section 256 to the storage 80a in which the data block is to be stored (S650). The completion notice section 242 responds a reconstruction completion notice to the host system 20 via the transfer unit 50 and the host connection unit 30 (S655, S660).

As described above, when the storage system 10 receives a reconstruction request, it transfers the reconstruction request to the control section 200 controlling the storage 80 in which the regenerated data block is to be stored, and makes the control section 200 perform reconstruction processing. The control section 200 performing reconstruction processing makes some of the other control sections 200 read out the data block and/or the redundancy block required for reconstruction, and reconstructs the data block by using the data block and/or the redundancy block read out. When receiving a reconstruction request, the storage system 10 can make the plurality of control sections 200 perform distributed reconstruction processing. Thus, a phenomenon in which processing or communication is concentrated on a controller performing centralized processing to cause the controller to become a bottleneck can be prevented.

Figure 7:
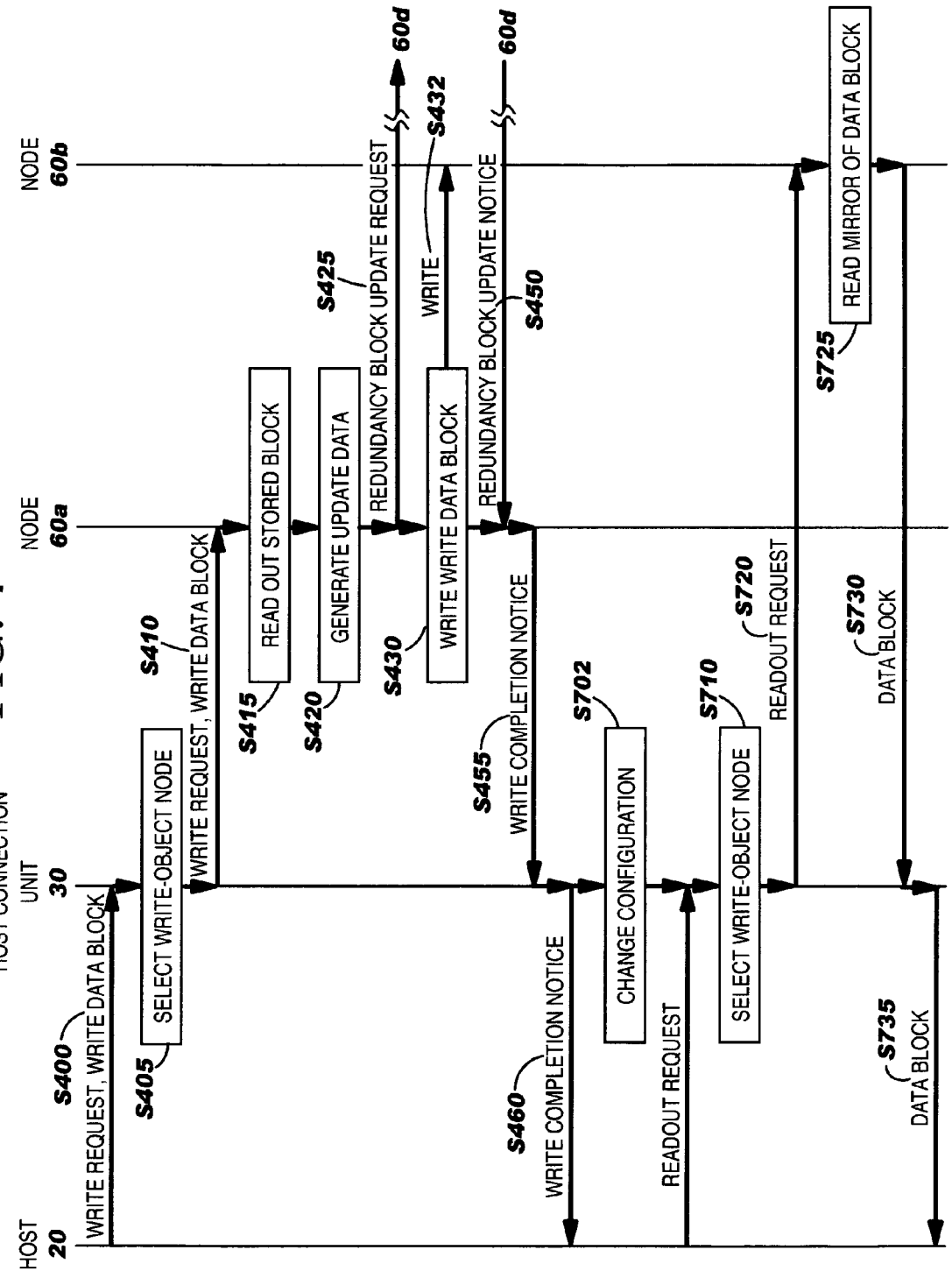
FIG. 7 shows the flow of data block readout processing in the storage system 10 according to the embodiment of the present invention when fault occurs.

FIG. 7 shows the flow of readout processing for reading out a data block from a mirror storage as an example of readout of DB1 in stripe 1 shown in FIG. 3 in the storage system 10 of this embodiment when the node 60a fails.

In this example, the storage system 10 has a RAID 50 configuration for example. More specifically, when each of the plurality of nodes 60 is operating without failure, the selector 270 in the node controller 70a and the selector 270 in the node controller 70b electrically connect the control section 200 in the node controller 70a to the storage 80a and the storage 81 band connect the control section 200 in the node controller 70b to the storage 80b and the storage 81a.

In this state, the control section 200 in the node controller 70a controls the storage 80a in which the data block DB1 is stored and the storage 81b in which the mirror block DB1' which is a mirror of the data block DB1 is stored. Also, the control section 200 in the node controller 70b controls the storage 80b in which the data block DB2 is stored and the storage 81a in which the mirror block DB2' which is a mirror of the data block DB2 is stored. The control section 200 in the node controller 70a, the storage 80a and the storage 81a are mounted on the sub assembly for the node 60a, while the control section 200 in the node controller 70b, the storage 80b and the storage 81b are mounted on the sub assembly for the node 60b.

When the storage system 10 receives from the host system 20 a request for writing the data block DB1 in stripe 1, it performs the same write processing as that shown as S400 to S460 in FIG. 4. In S430, the data block write section 222 in the node controller 70a may further write the write data block to the storage 81b through the selector 270 in the node controller 70a and the selector 270 in the node controller 70b.

If in this state the host connection unit 30 receives from the host system 20 a request for reading out the data block DB1, the control section 200 in the node controller 70a reads out the data block DB1 from the storage 80a and responds the data block DB1 to the host system 20. If a request for reading out the data block DB2 is received from the host system 20, the control section 200 in the node controller 70b reads out the data block DB2 from the storage 80b and responds the data block DB2 to the host system 20.

When the node controller 70a and/or the storage 80a fails (S700), the host connection unit 30 makes a change in configuration as to which one of the plurality of storages 80 and the plurality of storages 81 each of the plurality of node controllers 70 controls (S702). In this example, the selector 270 in the node controller 70b receives a configuration change instruction from the host connection unit 30 (S704) and changes the connection form so that an electrical connection is established between the control section 200 in the node controller 70b and the storage 81b in place of the electrical connection between the control section 200 in the node controller 70b and the storage 81a.

When a request for reading out the data block DB1 stored in the storage 80a is received in a state where the node controller 70a and the storage 80a are faulty (S710), the host control section 34 in the host connection unit 30 selects the control section 200 in the node controller 70b (S715) and transfers the data block DB1 readout request (S720). When the control section 200 in the node controller 70b receives the readout request through the request receiving section 212, it reads out through the data block readout section 232 the mirror block DB1' of the data block DB1 from the storage 81b electrically connected to the selector 270 (S725) and responds the read mirror block to the host connection unit 30 (S730). The host control section 34 in the host connection unit 30 responds the mirror block DB1' read out by the control section 200 in the node controller 70b in S720, S725 and S730 to the host system 20 as the readout-object data block (S735).

In the above-described storage system 10, if a RAID 50 configuration is used, a mirror block can be read out from a mirror storage even when one of the nodes 60 fails, thus improving the fault tolerance. Both the selectors 270 respectively provided in each pair of nodes 60 may be simultaneously set in the straight connection form or in the cross connection form.

Figure 8:
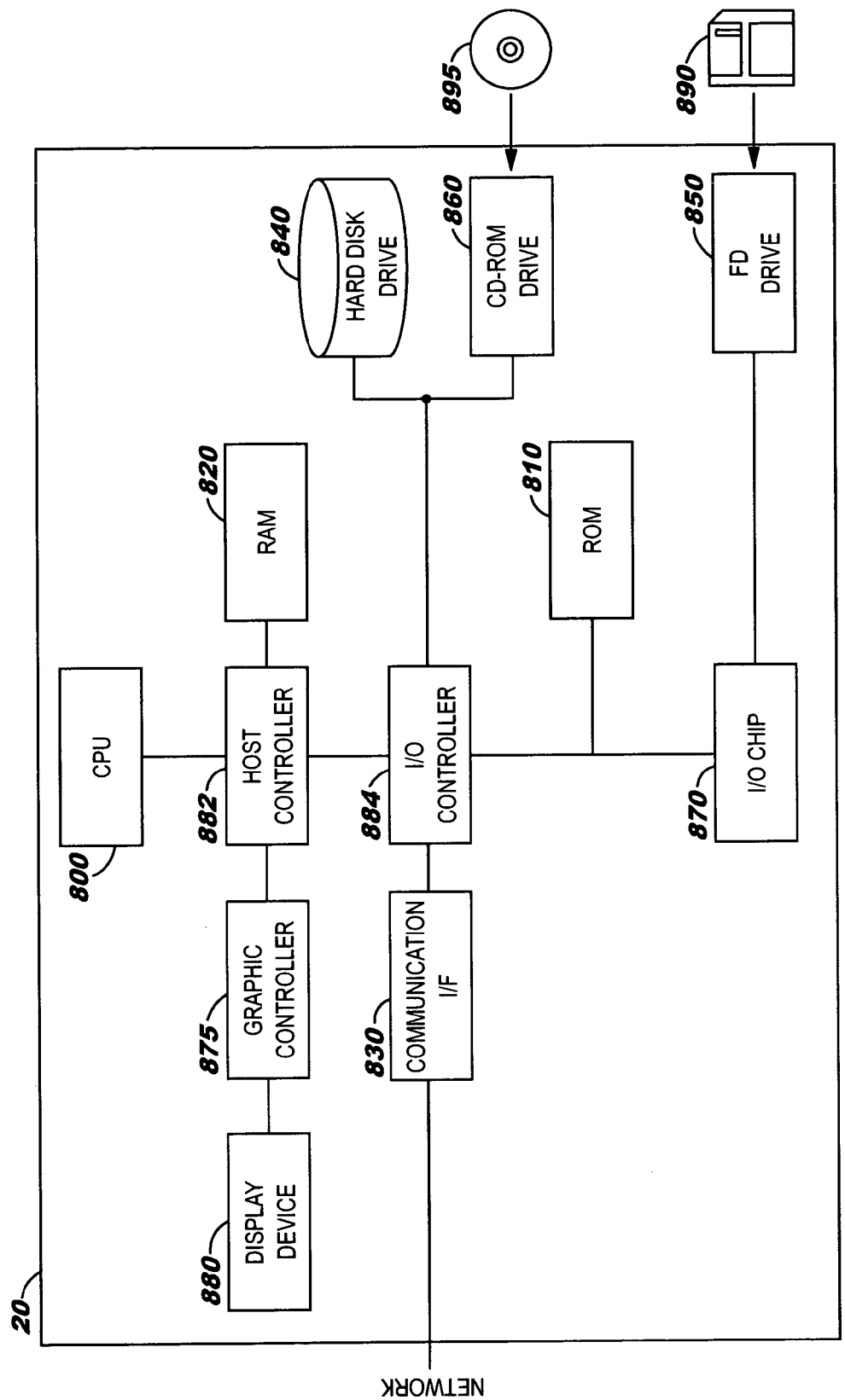
FIG. 8 shows an example of a hardware configuration of host system 20 according to the embodiment of the present invention.

FIG. 8 shows an example of a hardware configuration of the host system 20 of this embodiment. The host system 20 of this embodiment has a CPU peripheral section having a CPU 800, a RAM 820, a graphic controller 875 and a display device 880 connected to each other by a host controller 882, an input/output section having a communication interface 830, a hard disk drive 840 and a CD-ROM drive 860 connected to the host controller 882 by an input/output controller 884, and a legacy input/output section having a ROM 810, a flexible disk drive 850 and an input/output chip 870 connected to the input/output controller 884.

The host controller 882 connects the RAM 820, and the CPU 800 and the graphic controller 875, which access the RAM 820 at a high transfer rate. The CPU 800 operates on the basis of programs stored in the ROM 810 and the RAM 820 and controls each component. The graphic controller 875 obtains image data generated, for example, by the CPU 800 on an enclosure buffer provided in the RAM 820, and displays the image data on the display device 880. Alternatively, the graphic controller 875 may contain therein an enclosure buffer for storing image data generated by the CPU 800, etc.

The input/output controller 884 connects the host controller 882, the communication interface 830, which is an input/output device of a comparatively high speed, the hard disk drive 840 and the CD-ROM drive 860. The communication interface 830 performs communication with other units through a network. The hard disk drive 840 stores programs and data used by the host connection unit 30 and the plurality of node controllers 70 in the storage system 10. The CD-ROM drive 860 reads a program or data from a CD-ROM 895 and provides the read program or data to the storage system 10 by means of the RAM 820 and/or the hard disk drive 840 and the communication interface 830.

To the input/output controller 884 are also connected the ROM 810 and input/output devices of a comparatively low speed, i.e., the flexible disk drive 850 and the input/output chip 870 or the like. The ROM 810 stores a boot program executed by the host system 20 at the time of startup, and programs, etc., dependent on the hardware of the host system 20. The flexible disk drive 850 reads a program or data from a flexible disk 890 and provides the read program or data to the storage system 10 by means of the RAM 820 and/or the hard disk drive 840 and the communication interface 830. The input/output chip 870 connects the flexible disk 890 and various input/output devices, for example, through a parallel port, a serial port, a keyboard port, a mouse port, etc.

Programs provided to the storage system 10 by means of the RAM 820 and/or the hard disk drive 840 are provided by a user in a state of being stored on a recording medium, such as the flexible disk 890, the CD-ROM 895, or an IC card. The programs are read out from the recording medium, installed in the host connection unit 30 and the plurality of nodes 60 in the storage system 10 through the input/output controller 884 and the RAM 820, and executed in the CPU 800.

The programs installed and executed in the host connection unit 30 and the plurality of node controllers 70 in the storage system 10 have a host control module including a cache control module, a request receiving module, a reply receiving module, a data block write module, a redundancy block write module, a data block readout module, a redundancy block readout module, a completion notice module, a block respond module, a request transmitting module, an update data generation module, a redundancy block generation module, a data block generation module, a redundancy block update request module, and a block readout request module. These programs or modules enable the host connection unit 30 and the plurality of node controllers 70 to respectively function as the host control section 34 including the cache control section 36, the request receiving section 212, the reply receiving section 214, the data block write section 222, the redundancy block update section 224, the data block readout section 232, the redundancy block readout section 234, the completion notice section 242, the block respond section 244, the request transmitting section 246, the update data generation section 252, the redundancy block generation section 254, the data block regeneration section 256, the redundancy block update request section 262, and the block readout request section 264.

The programs or modules shown above may be stored on an external storage medium. As the storage medium, an optical recording medium such as a DVD or a PD, a magneto-optic recording medium such as an MD, a tape medium, a semiconductor memory such as an IC card, or the like can be used as well the flexible disk 890 and the CD-ROM 895. Also, a storage such as a hard disk or a RAM provided in a server system connected to a special-purpose communication network or the Internet may be used as the recording medium to provide the programs to the storage system 10 via the network.

While the present invention has been described with respect to the embodiment thereof, it is not limited to the scope described above with respect to the embodiment. Various changes and modifications may be made in the above-described embodiment. It is apparent from the description in the appended claims that other embodiments of the invention provided by making such changes and modifications are also included in the technical scope of the present invention.

According to the above-described embodiment, the storage system, controller, control method, a program therefor and recording medium described in items below can be realized.

(Item 1) A storage system in which a set of a data block and a redundancy block which is redundancy data for regenerating the data block when the data block becomes unreadable is stored by being distributed to a plurality of storages on a block-by-block basis, the system having a plurality of control sections which respectively control the plurality of storages, a host connection unit which receives from an external host system a write data block which is a data block to be stored in the storage system, and which selects the control section controlling the storage in which the write data block is to be stored, and a transfer unit which transfers the received write data block to the control section controlling the storage in which the write data block is to be stored, each of the plurality of control sections including a data block write section which writes the write data block transferred from the transfer unit to the storage in which the write data block is to be stored, a redundancy block update request section which requests the control section controlling the storage in which the redundancy block in the set including the write data block is to be stored to update the redundancy block, and a redundancy block update section which updates the redundancy block stored in the storage controlled by the control section when another of the control sections makes a request for updating the redundancy block.

(Item 2) The storage system according to Item 1, wherein each of the plurality of control sections includes a data block readout section which reads out a stored data block stored in the storage area in the storage to which the write data block transferred by the transfer unit is to be written, before writing the write data block to the storage in which the write data block is to be stored, an update data generation section which generates update data used for updating the redundancy block on the basis of the write data block transferred by the transfer unit and the stored data block, a redundancy block readout section which reads out the redundancy block before updating stored in the storage controlled by the control section when the another control section makes a request for updating the redundancy block, and a redundancy block generation section which generates in the set including the write data block a new redundancy block corresponding to the redundancy block on the basis of the redundancy block before updating and the update data generated by the update data generation section, wherein the redundancy block update section writes the redundancy block generated by the redundancy block generation section to the storage in which the redundancy block is to be stored.

(Item 3) The storage system according to Item 2, wherein the update data generation section generates the update data by performing exclusive OR operation on the write data block and the stored data block on a bit-by-bit basis, and wherein the redundancy block generation section generates in the set including the write data block a new redundancy block corresponding to the redundancy block by performing exclusive OR operation on the redundancy block before updating and the update data on a bit-by-bit basis.

(Item 4) The storage system according to Item 2, wherein the data block write section writes the write data block transferred by the transfer unit to the storage controlled by the control section including the data block write section and to a mirror storage functioning as a mirror of the storage, and wherein when the redundancy block update section is requested by the another control section to update the redundancy block, it updates the redundancy blocks respectively stored in the storage controlled by the control section including the redundancy block update section and the mirror storage functioning as a mirror of the storage.

(Item 5) The storage system according to Item 4, wherein a first control section corresponding to the control section, the storage controlled by the first control section and a second mirror storage corresponding to the mirror storage and functioning as a mirror of the storage controlled by a second control section corresponding to the control section are mounted on a first sub assembly detachably mounted on an enclosure for the storage system, and wherein the second control section, the storage controlled by the second control section and a first mirror storage corresponding to the mirror storage and functioning as a mirror of the storage controlled by the first control section are mounted on a second sub assembly detachably mounted on the enclosure for the storage system.

(Item 6) The storage system according to Item 5, further having a first selector which selects between electrical connection of the first control section to the first mirror storage and electrical connection of the first control section to the second mirror storage, and a second selector which selects between electrical connection of the second control section to the second mirror storage and electrical connection of the second control section to the first mirror storage.

(Item 7) The storage system according to Item 6, wherein the first selector selects between electrical connection of the first control section to the second mirror storage and electrical connection of the first control section to the first mirror storage via the first selector and the second selector, and the second selector selects between electrical connection of the second control section to the first mirror storage and electrical connection of the second control section to the second mirror storage via the second selector and the first selector.

(Item 8) The storage system according to Item 6, wherein the second selector electrically connects the second control section to the first mirror storage when the first storage and/or the first control section fails, and wherein when a request for reading out the data block stored in the first storage is received from the host system in a state where the first storage and/or the first control section is faulty, the host connection unit reads out a data block which is a mirror of the data block from the first mirror storage by means of the second control section, and responds the read data block to the host system.

(Item 9) The storage system according to Item 1, wherein a set of a plurality of data blocks and a redundancy block which is redundancy data for regenerating at least one of the data blocks when the at least one of the data blocks becomes faulty is stored by being distributed to the plurality of storages, wherein when a readout request for reading out a unreadable one of the data blocks is received from the external host system, the host connection unit transfers through the transfer unit the readout request to the control section controlling the storage in which the redundancy block in the set including the unreadable data block is stored, and wherein each of the plurality of control sections further includes a redundancy block readout section which, in the case of receiving the request for reading out the unreadable data block, reads out the redundancy block in the set including the unreadable data block from the storage in which the redundancy block is stored, a block readout request section which, in the case of receiving the request for reading out the unreadable data block, requests the another control section controlling the storage in which the normal data block in the set including the unreadable data block and the redundancy block is stored to read out the normal data block, a data block regeneration section which regenerates the unreadable data block to the original state on the basis of the normal data block read out by the another control section according to the request from the block readout request section and the redundancy block, and a data block respond section which responds the regenerated data block to the host system through the host connection unit.

(Item 10) The storage system according to Item 6, wherein the host connection unit has a cache memory section which stores a data block read out in response to a readout request from the host system, and a cache control section which responds the data block from the cache memory section to the host system when a readout request for reading out the data block stored in the cache memory section is received from the host system, wherein the cache control section sets a higher priority with which the data block regenerated from a faulty state to the original state by the data block regeneration section remains in the cache memory section in comparison with the data block which has not been unreadable.

(Item 11) The storage system according to Item 1, wherein a set of a plurality of data blocks and a redundancy block which is redundancy data for regenerating at least one of the data blocks when the at least one of the data blocks becomes faulty is stored by being distributed to the plurality of storages, wherein when a reconstruction request for regenerating a unreadable one of the data blocks to the original state and writing the regenerated data block to the storage in which the data block is to be stored is received from the external host system, the host connection unit transfers the request for reconstruction of the unreadable data block to the control section controlling the storage in which the data block is to be stored, wherein each of the plurality of control sections further includes a block readout request section which requests some of the other control sections controlling the storage in which the data block or the redundancy block in the set including the unreadable data block is stored to read out the data block or the redundancy block in the set including the unreadable data block, and a data block regeneration section which regenerates the unreadable data block on the basis of the data block and the redundancy block responded from some of the other control sections according to the request from the block readout request section, and wherein the data block write section writes the data block regenerated by the data block regeneration section to the storage in which the data block is to be stored.

(Item 12) The storage system according to Item 1, wherein when the redundancy block update section updates the redundancy block, it transmits a redundancy block update notice to the control section that has requested update of the redundancy block, and wherein the control section that has requested update of the redundancy block further includes a completion notice section which transmits a write completion notice to the host system through the host connection unit when the redundancy block update notice is received and when the write data block in the set including the redundancy block is written to the storage in which the write data block is to be stored.

(Item 13) A storage system in which a set of data blocks and mirror blocks which are mirrors of the data blocks is stored by being distributed to a plurality of storages on a block-by-block basis, the storage system having a first control section which controls the first storage in which the first data block is stored and the second storage in which the first mirror block which is a mirror of the first data block is stored, a second control section which controls the third storage in which the second data block is stored and the fourth storage in which the second mirror block which is a mirror of the second data block is stored, a host connection unit which reads out the first data block from the first storage through the first control section and responds the first data block to an external host system when receiving from the host system a request for reading out the first data block, and which reads out the second data block from the second storage through the second control section and responds the second data block to the host system when receiving from the host system a request for reading out the second data block, and a selector which establishes an electrical connection between the first control section and the fourth storage in place of an electrical connection between the first control section and the second storage when the second control section or the first storage fails, wherein when the second data block readout request is received from the host system in a state where the second control section is faulty, the host connection unit transfers the second data block readout request to the first control section, and the first control section receiving the second data block readout request reads out the second mirror block from the fourth storage electrically connected by the selector, and responds the second mirror block to the host connection unit.

(Item 14) A controller for a storage system in which a set of a data block and a redundancy block which is redundancy data for regenerating the data block when the data block becomes unreadable is stored by being distributed to a plurality of storages on a block-by-block basis, the system having a plurality of the controllers which respectively control the plurality of storages, a host connection unit which receives from an external host system a write data block which is a data block to be stored in the storage system, and which selects the controller controlling the storage in which the write data block is to be stored, and a transfer unit which transfers the received write data block to the controller controlling the storage in which the write data block is to be stored, each of the plurality of controllers having a data block write section which writes the write data block transferred from the transfer unit to the storage in which the write data block is to be stored, a redundancy block update request section which requests the controller controlling the storage in which the redundancy block in the set including the write data block is to be stored to update the redundancy block, and a redundancy block update section which updates the redundancy block stored in the storage controlled by the controller when another of the controllers makes a request for updating the redundancy block.

(Item 15) A controller for a storage system in which a set of data blocks and mirror blocks which are mirrors of the data blocks is stored by being distributed to a plurality of storages on a block-by-block basis, the storage system having the controller controlling the first storage in which the first data block is stored and the second storage in which the first mirror block which is a mirror of the first data block is stored, another controller controlling the third storage in which the second data block is stored and the fourth storage in which the second mirror block which is a mirror of the second data block is stored, and a host connection unit which reads out the first data block from the first storage through the controller and responds the first data block to an external host system when receiving from the host system a request for reading out the first data block, and which reads out the second data block from the second storage through the another controller and responds the second data block to the host system when receiving from the host system a request for reading out the second data block, the host connection unit transferring the second data block readout request to the controller when receiving the second data block readout request from the host system in a state where the another controller or the third storage is faulty, the controller having a selector which establishes an electrical connection between the controller and the fourth storage in place of an electrical connection between the controller and the second storage when the another controller or the third storage fails, and a control section which reads out the second mirror block from the fourth storage electrically connected by the selector and responds the second mirror block to the host connection unit when the second data block readout request is received in a state where the another controller is faulty.

(Item 16) A method of controlling a storage system in which a set of a data block and a redundancy block which is redundancy data for regenerating the data block when the data block becomes unreadable is stored by being distributed to a plurality of storages on a block-by-block basis, the storage system having a plurality of controllers which respectively control the plurality of storages, a host connection unit which receives from an external host system a write data block which is a data block to be stored in the storage system, and which selects the controller controlling the storage in which the write data block is to be stored, and a transfer unit which transfers the received write data block to the controller controlling the storage in which the write data block is to be stored, the method including in each of the plurality of controllers a data block write step of writing the write data block transferred from the transfer unit to the storage in which the write data block is to be stored, a redundancy block update request step of requesting the controller controlling the storage in which the redundancy block in the set including the write data block is to be stored to update the redundancy block, and a redundancy block update step of updating the redundancy block stored in the storage controlled by the controller when another of the controllers makes a request for updating the redundancy block.

(Item 17) A method of controlling a storage system in which a set of data blocks and mirror blocks which are mirrors of the data blocks is stored by being distributed to a plurality of storages on a block-by-block basis, the storage system having a first controller which controls the first storage in which the first data block is stored and the second storage in which the first mirror block which is a mirror of the first data block is stored, a second controller which controls the third storage in which the second data block is stored and the fourth storage in which the second mirror block which is a mirror of the second data block is stored, and a host connection unit which, when receiving from an external host system a request for reading out the first data block, reads out the first data block from the first storage through the first controller and responds the first data block to the host system, and which, when receiving from the host system a request for reading out the second data block, reads out the second data block from the second storage through the second controller and responds the second data block to the host system, the method including a transfer step of causing the host connection unit to transfer the second data block readout request to the controller when receiving the second data block readout request from the host system in a state where the second controller or the third storage is faulty, a selector step of establishing an electrical connection between the first controller and the fourth storage in place of an electrical connection between the first controller and the second storage when the second controller or the third storage fails, and a control step of causing the first controller to read out the second mirror block from the fourth storage electrically connected in the selector step and responding the second mirror block to the host connection unit when the second data block readout request is received in a state where the second controller is faulty.

(Item 18) A program for controlling a storage system in which a set of a data block and a redundancy block which is redundancy data for regenerating the data block when the data block becomes unreadable is stored by being distributed to a plurality of storages on a block-by-block basis, the storage system having a plurality of control sections which respectively control the plurality of storages, a host connection unit which receives from an external host system a write data block which is a data block to be stored in the storage system, and which selects the control section controlling the storage in which the write data block is to be stored, and a transfer unit which transfers the received write data block to the control section controlling the storage in which the write data block is to be stored, the program enabling each of the plurality of control sections to function as a data block write section which writes the write data block transferred from the transfer unit to the storage in which the write data block is to be stored, a redundancy block update request section which requests the control section controlling the storage in which the redundancy block in the set including the write data block is to be stored to update the redundancy block, and a redundancy block update section which updates the redundancy block stored in the storage controlled by the control section when another of the control sections makes a request for updating the redundancy block.

(Item 19) A recording medium on which the program according to Item 18 is recorded.

ADVANTAGES OF THE INVENTION

According to the present invention, as is apparent from the foregoing, the performance of a large-scale storage system can be improved by preventing a controller from becoming a bottleneck.

The invention claimed is:

1. A Storage system comprising:
a plurality of storages;
a plurality of control sections which respectively control the plurality of storages;
a host connection unit which receives from an external host system a write data block which is a data block to be stored in the plurality of storages, and which selects a control section controlling the storage in which the write data block is to be stored; and
a transfer unit which transfers the received write data block to said control section controlling the storage in which the write data block is to be stored, each of said plurality of control sections including:
a data block write section which writes the write data block transferred from the transfer unit to the storage in which the write data block is to be stored;
a redundancy block update request section which requests said control section controlling the storage in which a redundancy block in the set including the write data block is to be stored to update the redundancy block; and
a redundancy block update section which updates the redundancy block stored in the storage controlled by said control section when another of said control sections makes a request for updating the redundancy block;

wherein said data block write section writes the write data block transferred by said transfer unit to the storage controlled by said control section including said data block write section and to a mirror storage functioning as a mirror of said storage; and wherein when said redundancy block update section is requested by said another control section to update the redundancy block, it updates the redundancy blocks respectively stored in the storage controlled by said control section including said redundancy block update section and the mirror storage functioning as a mirror of said storage, wherein a first control section corresponding to said control section, the storage controlled by said first control section and a second mirror storage corresponding to said mirror storage and functioning as a mirror of the storage controlled by a second control section corresponding to said control section are mounted on a first sub assembly detachably mounted on an enclosure for the storage system, and wherein said second control section, the storage controlled by said second control section and a first mirror storage corresponding to said mirror storage and functioning as a mirror of the storage controlled by said first control section are mounted on a second sub assembly detachably mounted on the enclosure for the storage system.

2. The storage system according to claim 1, further comprising:
a first selector which selects between electrical connection of said first control section to said first mirror storage and electrical connection of said first control section to said second mirror storage; and
a second selector which selects between electrical connection of said second control section to said second mirror storage and electrical connection of said second control section to said first mirror storage.

3. The storage system according to claim 2, wherein said first selector selects between electrical connection of said first control section to said second mirror storage and electrical connection of said first control section to said first mirror storage via said first selector and said second selector; and
said second selector selects between electrical connection of said second control section to said first mirror storage and electrical connection of said second control section to said second mirror storage via said second selector and said first selector.

4. The storage system according to claim 2, wherein said second selector electrically connects said second control section to said first mirror storage when said first storage and/or said first control section fails; and
where when a request for reading out the data block stored in said first storage is received from the host system in a state where said first storage and/or said first control section is faulty, said host connection unit reads out a data block which is a mirror of said data block from said first mirror storage by means of said second control section, and responds the read data block to the host system.

5. The storage system according to claim 1 wherein a set of a plurality of data blocks and a redundancy block which is redundancy data for regenerating at least one of the data blocks when the at least one of the data blocks becomes faulty is stored by being distributed to the plurality of storages, wherein when a readout request for reading out an unreadable one of the data blocks is received from the external host system, said host connection unit transfers through said transfer unit the readout request to said control section controlling the storage in which the redundancy block in the set including the unreadable data block is stored.

6. The storage system according to claim 5 wherein each of said plurality of control sections further includes:

a redundancy block readout section which, in the case of receiving the request for reading out the unreadable data block, reads out the redundancy block in the set including the unreadable data block from the storage in which the redundancy block is stored;

a block readout request section which, in the case of receiving the request for reading out the unreadable data block, requests said another control section controlling the storage in which the normal data block in the set including the unreadable data block and the redundancy block is stored to read out the normal data block;

a data block regeneration section which regenerates the unreadable data block to the original state on the basis of the normal data block read out by said another control section according to the request from said block readout request section and the redundancy block; and a data block respond section which responds the regenerated data block to the host system through said host connection unit.

7. The storage system according to claim 1 wherein said host connection unit includes:

a cache memory section which stores a data block read out in response to a readout request from the host system; and a cache control section which responds the data block from said cache memory section to the host system when a readout request for reading out the data block stored in said cache memory section is received from the host system, wherein said cache control section sets a higher priority with which a data block regenerated from a faulty state to the original state by a data block regeneration section remains in said cache memory section in comparison with the data block which has not been unreadable.

8. The storage system according to claim 1 wherein a set of a plurality of data blocks and a redundancy block which is redundancy data for regenerating at least one of the data blocks when the at least one of the data blocks becomes faulty is stored by being distributed to the plurality of storages, wherein when a reconstruction request for regenerating an unreadable one of the data blocks to the original state and writing the regenerated data block to the storage in which the data block is to be stored is received from the external host system, said host connection unit transfers the request for reconstruction of the unreadable data block to said control section controlling the storage in which the data block is to be stored;

wherein each of said plurality of control sections further includes:

a block readout request section which requests some of the other control sections controlling the storage in which the data block or the redundancy block in the set including the unreadable data block is stored to read out the data block or the redundancy block in the set including the unreadable data block; and a data block regeneration section which regenerates the unreadable data block on the basis of the data block and the redundancy block responded from some of the other control sections according to the request from said block readout request section, and wherein said data block write section writes the data block regenerated by said data block regeneration section to the storage in which the data block is to be stored.

9. The storage system according to claim 1 wherein when said redundancy block update section updates the redundancy block, it transmits a redundancy block update notice to said control section that has requested update of the redundancy block, and wherein said control section that has requested update of the redundancy block further includes a completion notice section which transmits a write completion notice to the host system through said host connection unit when the redundancy block update notice is received and when the write data block in the set including the redundancy block is written to the storage in which the write data block is to be stored.

* * * * *